Patented Jan. 26, 1937

2,068,854

UNITED STATES PATENT OFFICE 2,068,854

TREATING OXYGENATED ORGANIC COMPOUNDS

Per K. Frolich, Roselle, N. J., assignor to Standard Oil Development Company, a corporation of Delaware No Drawing. Application July 30, 1932,
Serial No. 627,151

9 Claims. (Cl. 260—172)

This invention relates to an improved method of treating oxygenated organic compounds and more particularly to a controlled thermal decomposition of the products obtained by the oxidation of heavy hydrocarbons, such as paraffin wax, and to the products obtained by such processes.

When a heavy hydrocarbon, such as paraffin wax, is oxidized, the products obtained consist of a more or less complex mixture of fatty acids, alcohols, ketones, lactones, etc. and it is one object of this invention to produce more valuable products from the mixture so obtained. For example, on distillation of the products obtained by the oxidation of paraffin wax, a residue of 10 to 20 percent is obtained which consists chiefly of fatty acids of molecular weight corresponding to about $C_{20}$ and higher, alcohols, esters, ketones, lactones and other oxygenated products. It is an object of this invention to convert it into more useful compounds by cracking it at elevated temperature.

Broadly speaking, this invention comprises the cracking of such products of oxidation of heavy hydrocarbons, under carefully controlled conditions so as to obtain a maximum amount of the oxygenated groups in the form of compounds of low and medium molecular weight with a minimum amount of residual pitch. This cracking may be conducted either under pressure in the liquid state by a method similar to that employed in the petroleum industry for the thermal breakdown of hydrocarbons or the material may be decomposed at either atmospheric or reduced pressure in the vapor phase. Suitable contact masses may be employed in either type of cracking if desired, the temperature being regulated to obtain the best results with the particular materials being used and according to the specific purposes for which the products will be used.

By way of illustration only and not desiring to be limited thereby, the following specific example is given of one method of carrying out the invention. The raw material which I prefer to use is the residue obtained on distillation of the products obtained by the oxidation of paraffin wax. This residue is submitted to controlled cracking in the vapor phase either with or without steam in the presence of contact masses such as calcium carbonate, ferrous oxide, etc., at temperatures from 400° C. to 700° C.; the exact temperature being so regulated in relation to the time of contact as to give the optimum results depending on the contact mass and the type of feed stock being used. When the temperature is around the upper limit of the range stated, for example, from 600 to 700° C., usually a time of contact of about one second is sufficient. The product obtained is a complex mixture consisting largely of the higher ketones, aldehydes, unsaturated hydrocarbons, pyrones and other oxygenated compounds partly of lower molecular weight than the original material before thermal decomposition. Due to the nature of the raw material, mixed ketones are formed in preference to simple ketones. Although the mixed product may be used as such, I prefer to separate it to some extent by fractionation, or extraction or by any other suitable means, into various cuts.

Certain high boiling cuts, for example, are useful as plasticizers particularly for cellulose acetate and similar cellulose esters when used as plastic coatings and the like, and the heavy ends including the high boiling cuts and the bottoms in particular being useful for compounding of rubber where they may be preferable to the original highly acid oxidation product. Parts of my thermal decomposition product are also valuable as constituents of various types of dressing compounds and polishes.

Instead of operating in the vapor phase as described above, the operation may be carried out in the liquid phase especially whenever it is desired to use a longer time of contact to obtain better selectivity at a given temperature.

The invention may be carried out either by batch operation or continuous operation, the latter being preferred, and in the case of continuous operation one or more of the decomposition products may be recycled through the reaction zone thereby being submitted to further decomposition.

If desired, a preliminary neutralization of the raw material comprising such oxidized materials may be effected by reacting with lime or any other suitable neutralizing agent.

In such case, it is preferable to carry out the cracking in a rotary retort equipped with scrapers to remove adhered decomposed salts and make them available for neutralization of fresh feed stock.

It is obvious that a number of variations may be made in the exact method of carrying out my preferred thermal decomposition without departing from the scope of the invention but I wish to claim all inherent novelty as broadly as the prior art permits.

I claim:

1. The process of preparing oxygenated organic compounds which comprises subjecting products having a molecular weight corresponding to about $C_{20}$ and higher, produced by the oxidation of paraffin wax, to controlled thermal decomposition at a temperature between the approximate limits of 400–700° C. in the presence of a contact mass favoring the production of low and medium molecular weight ketones, aldehydes, pyrones, with a time of contact corresponding approximately to that of one second when the temperature is between 600–700° C.

2. Process according to claim 1, in which the oxidation products are given a preliminary neutralization before being thermally decomposed.

3. Process according to claim 1, carried out in the vapor phase at a pressure not substantially above atmospheric.

4. Process according to claim 1, carried out in the liquid phase under superatmospheric pressure.

5. Process according to claim 1, in which a contact mass selected from the group consisting of calcium carbonate and ferrous oxide is used.

6. Process according to claim 1, carried out in the presence of steam.

7. Process according to claim 1, carried out continuously by continuously feeding the products of oxidation of heavy saturated hydrocarbons to the decomposition zone and continuously withdrawing the decomposition products, separating them into light and heavy products, and recirculating the heavy products through the reaction zone.

8. Process according to claim 1, carried out in the presence of calcium carbonate.

9. A product consisting largely of higher ketones, aldehydes, unsaturated hydrocarbons, pyrones and other oxygenated compounds and prepared by the process defined in claim 1.

PER K. FROLICH.